3,451,563
DEVICE FOR SEPARATING FLAT ARTICLES FROM A CONTINUOUSLY SUPPLIED LINE OF ARTICLES
Pierre Luginbuhl, Neuhausen am Rheinfall, Switzerland, assignor to Schweizerische Industrie-Gesellschaft, Neuhausen am Kheinfall, Switzerland
Filed Aug. 22, 1967, Ser. No. 662,381
Claims priority, application Switzerland, Aug. 29, 1966, 12,459/66
Int. Cl. B65g 59/12, 57/16
U.S. Cl. 214—8.5　　　　　　　　　　　　　　6 Claims

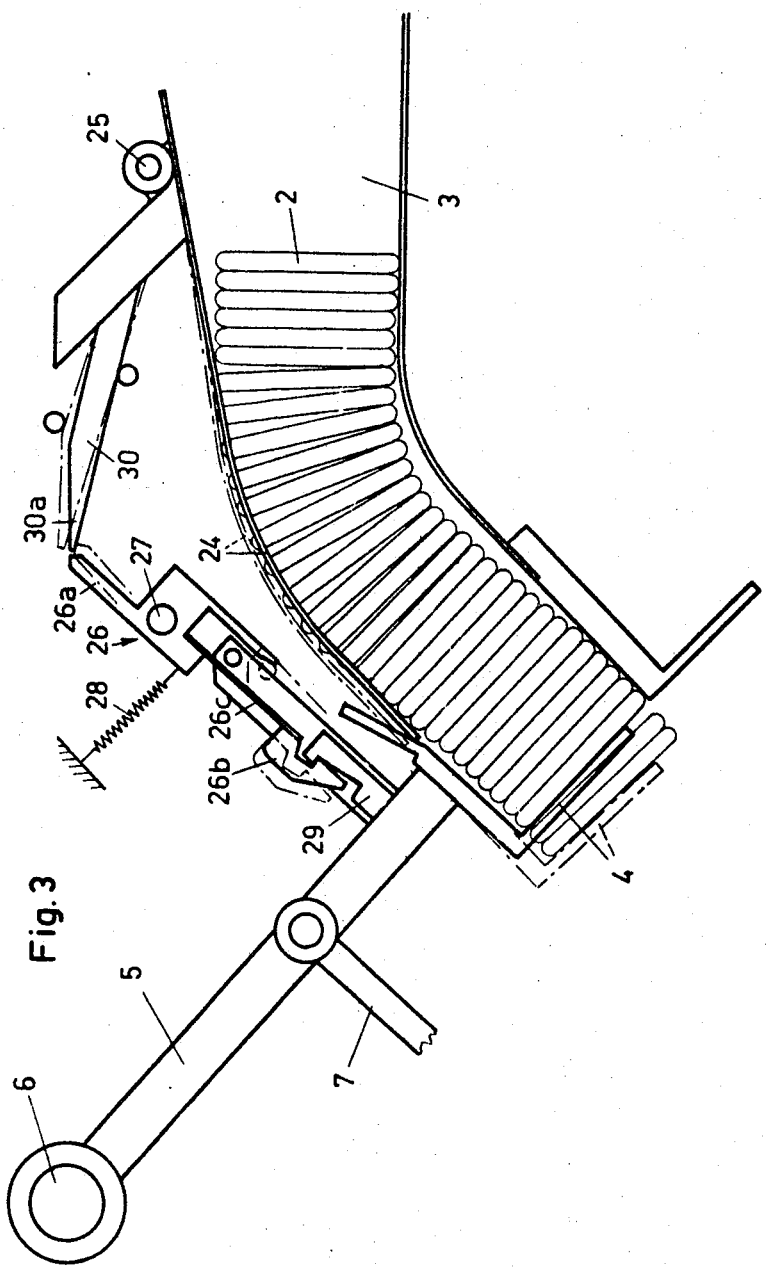

ABSTRACT OF THE DISCLOSURE

A device for separating flat articles from a continuously supplied line of such articles, in which the articles move along in a trough whose discharge end is inclined to the horizontal and is controlled by a pivotally mounted bottom plate adapted to move away from said discharge end so as to permit a predetermined number of articles to be transversely pushed from the trough by ejector means onto a transfer device comprising a slide plate and a pivoted carrying plate, which transfer device discharges the articles onto a collecting clamp.

---

The invention relates to a device for separating groups of equal numbers of flat articles from a continuously supplied line of such articles. Devices of this kind are known in various modifications.

The object of the invention is the improvement of such prior devices so as to make them more efficient. The device according to the invention provides for a continuous counting out and discharging of articles also during the simultaneous transfer of an already counted group of articles to another work station.

The device according to the invention is characterized by a conveyor trough, an adjustable bottom controlling the discharge aperture of the conveyor trough, at least one ejector pushing the articles out of the conveyor trough when the bottom is adjusted, and a collecting clamp for receiving discharged articles, which clamp is adjustable between its collecting position and its discharge position.

Preferably, means are provided for forming a storage space for holding the articles ejected by the ejectors during the time the collecting clamp is unable to receive them. In that way the collecting clamp including the group of articles held by it can be switched to its discharge position and the articles discharged are subsequently transferred to another conveyor or a work station without needing to interrupt the counting operation.

The invention will be described in further detail by way of an exemplary embodiment and with reference to the accompanying drawings, in which FIG. 1 is a diagrammatic side elevation view of the device according to the invention;

FIGS. 2, 2a and 3 illustrate details of the device illustrated in FIG. 1 in an enlarged scale;

FIG. 4 is a partial view in the direction of the arrow A in FIG. 1, and

Figure 1:
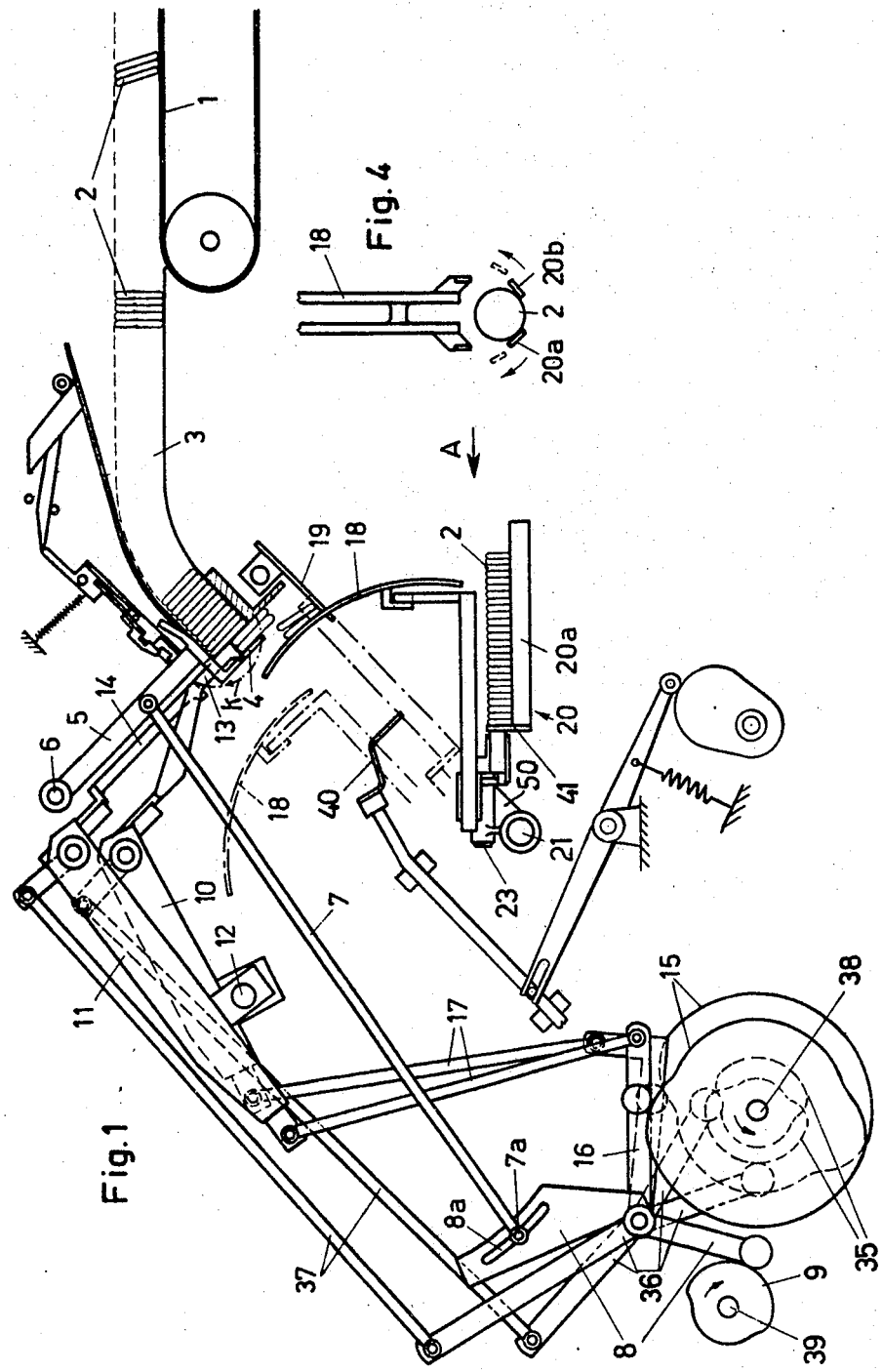
Figure 2:
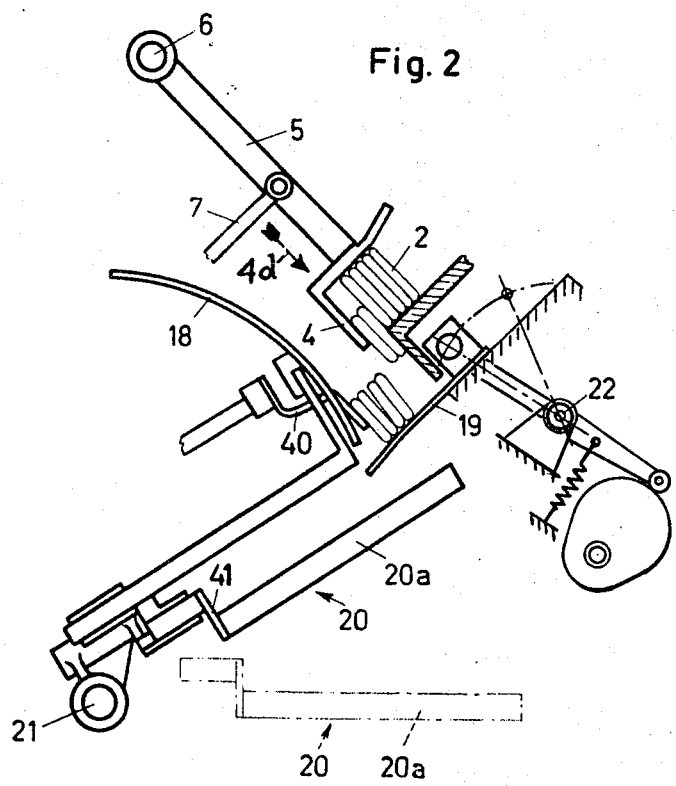

Referring to FIG. 1, flat articles 2, for example closely horizontally stacked biscuits, are conveyed on a conveyor belt 1 to a trough 3 which is bent downward at one end so as to form an angle of about 30° with respect to the horizontal plane. The lower end of the trough 3 is closed by a bottom plate 4 attached to the lower end of an arm 5, the upper end of which is pivotable about a horizontal axis 6. The arm 5 is joined between its ends by a rod 7 to a two-arm lever 8 which is subject to a periodical pivotal motion caused by a rotating cam disc 9 engaging the lower arm of the lever 8. By this pivotal motion the bottom plate 4 is lifted or moved away from the outlet aperture of the trough 3 a predetermined distance so that, as shown in FIGS. 1 and 2, for instance two articles may be discharged from the trough 3. By adjusting the fulcrum 7a of the rod 7 along the slot 8a in the lever 8 the length of the stroke and therewith the position of the bottom plate 4 can be changed and adjusted to the thickness of the stack or the number of articles counted at a time.

Hinged to pivot levers 10 and 11 pivotable about a common axis 12 are two ejectors 13 and 14. The two levers 10 and 11 are periodically reciprocated by cam discs 15 via a linkage 16, 17. The two cam discs 15 are offset to each other in such a manner that the two ejectors always move contrarily to each other. During their movement the two ejectors 13 and 14 are pivoted about their fulcrums together with the associated levers 10 and 11 in such a manner that the ends of the levers 10 and 11 describe a path k. This additional pivotal movement is produced by cam discs 35 which by way of levers 36 and tension rods 37 act upon the rear end of the ejectors 13 and 14.

Figure 2A:
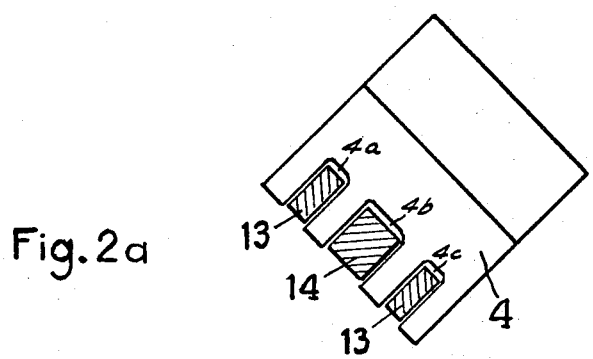

When in operation the ejectors 13 and 14 move between the lowered bottom plate 4 and the discharge aperture of the trough 3, whereby the articles present in this section of the trough 3 are laterally pushed out of the trough. Depending upon the position of the bottom plate 4, with each stroke of the ejectors 13 and 14 are discharged one, two or a greater number of articles. During their receding motion along the curve k the ejectors 13 and 14 gradually move through slots 4a, 4b and 4c (see FIG. 2a which is a view in the direction of the arrow 4d in FIG. 2) of the bottom plate 4 and thereby dispose thereon the remaining contents of the trough 3 which bear on the ejectors 13 and 14.

When the bottom plate 4 is open, the ejectors 13 and 14 perform a succession of work strokes the number of which depends on the size of the largest group of articles to be counted. Upon completion of each counting operation the bottom plate 4 returns to its closed position. The speed of the shaft 38 carrying the cam discs 15 and 35 for moving the ejectors 13 and 14 must therefore be a multiple of the speed of the shaft 39 controlling the bottom plate 4. If, for instance, the ejectors 13 and 14 are to perform five work strokes per counting period, a fivefold step-up gearing is installed between the shaft 38 and the shaft 39.

Upon uncovering of the trough aperture by the bottom plate 4 the ejectors 13 and 14 perform the predetermined number of work strokes and thereby push the desired number of articles out of the trough, whereupon the bottom plate 4 returns into its closing position. The articles ejected first drop upon a curved slide plate 18 and a carrying plate 19 where they are stored for the time being until they are permitted to slide onto a collecting clamp 20 provided to receive a predetermined number of articles and transfer them to another conveyor means or to a work station not illustrated in the drawings. The collecting clamp 20 is pivotally mounted about a horizontal axis 21 and is reciprocable between a receiving position shown in FIG. 1 by dash-dot lines and a discharge position illustrated by solid lines. The slide plate 18 extends upwardly from the collecting clamp 20 and is rigidly connected to the same and thereby also pivoted about the axis 21. The curved slide plate 18 is attached to the collecting clamp 20 in such a manner thtat during the backward motion of the latter it declines steadily in the region of the storage space. The carrying plate 19 is adapted to swing backward about a horizontal axis 22, as illustrated in FIG. 2. The collecting clamp 20 comprises two spaced parallel rails 20a, 20b for holding the articles 2 and, as illustrated in FIGS. 1 and 4, these rails are movable in opposite circular directions as indicated by arrows so as to allow the articles 2 to drop from the collecting clamp 20 in a downward direction.

A plunger 40 reciprocating lengthwise below the storage space formed by the slide plate 18 and the carrying plate 19 receives the articles 2 from the slide plate 18 before this plate leaves the storage space (see FIG. 2) and controls the further downward movement of the articles 2. Shortly thereafter the collecting clamp 20 again reaches its receiving position shown in FIG. 1 in solid lines. The carrying plate 19 is swung downwardly about the axis 22 and transfers the stored articles 2 to the collecting clamp 20.

After the plunger 40 has completed its downward motion and has deposited the counted group of articles on the bottom plate 41 of the collecting clamp 20, the latter is moved into its discharge position where it releases the counted group of articles. Thereupon the plunger 40 and the collecting clamp 20 return to their receiving position. The articles 2 which in the meantime were pushed out of the trough 3 by the ejectors 13 and 14 are continuously stored and simultaneously lowered in the space formed between the slide plate 18 and the carrying plate 19 until the plunger 40 and subsequently the collecting clamp 20 again are ready to receive them. The discharge of articles, then, from the trough 3 may begin as soon as the bottom plate 4 is lowered although the collecting clamp 20 is not yet in its receiving position. In this manner considerably more time for the counting operation is made available.

The device according to the invention is further provided with locking means to prevent the bottom plate 4 from swinging out when too few or no articles at all are in the trough 3. These locking means are illustrated in FIG. 3 in an enlarged scale. A chute cover 24 for the trough 3 is adapted to be pivoted at one end about a horizontal axis into an upper position illustrated in a dash-dotted line. This pivotal movement is caused by the articles 2 in the trough 3 as long as they are acted upon by the belt 1 and are being pushed upward against the cover 24. A double armed lever 26 above the chute cover 24 is pivotably mounted about a horizontal axis 27. The double armed lever 26 is provided with an upwardly extending arm 26a and on the other arm with a pawl 26b attached to a leaf spring 26c. A helical spring 28 attempts to pull the lever 26 clockwise into its unlocked position indicated by dash-dotted lines.

Fixedly attached to the lever 5 is a stop 29 which is in engagement with the pawl 26b when the bottom plate 4 touches the end of the trough 3, i.e. when it closes the trough aperture. Furthermore, the chute cover 24 has attached thereto an arm 30 which has on its free end a nose 30a engaging the free end of the arm 26a of the lever 26 when too few or no articles are present in the trough 3. In this position indicated by solid lines in FIG. 3 the pawl 26b engages the stop 29. Consequently, the lever 5 with the bottom plate 4 thereon is prevented from performing a swinging movement. The ejectors 13 and 14 will remain inoperative, during the following counting period. However, as soon as enough articles are in the trough 3, the trough cover 24 is raised. The nose 30a releases the arm 26a and the spring 28 pulls the lever 26 including the pawl 26b away from the stop 29. Now the lever 5 with the bottom plate 4 attached to it is again free to swing out. The articles 2 in the trough 3 move now into the range of the ejectors 13 and 14 and are pushed out of the trough during the following counting period. In this manner it is made sure that with each motion of the bottom plate 4 the predetermined number of articles is ejected from the trough 3. After the ejectors 13 and 14 have completed the predetermined number of work strokes, the bottom plate 4 is moved back into its closing position and thereafter is lowered again, provided the trough 3 is sufficiently filled. Thereupon the ejectors 13 and 14 initiate a fresh counting operation.

In order to be able to count out also large groups of articles at a high speed, it is advantageous to discharge with each stroke of the ejectors always two articles at a time, perhaps even more if they are thin and of uniform thickness. Thus, in the normal case, when the ejectors perform, for instance, five strokes per counting period, groups of 20 articles each are produced. If under the same conditions only 19 articles are desired to be counted out, then the return motion of the bottom plate 4 is divided into two partial motions of which the first one takes place immediately prior to the last operative stroke of the second ejector which then can seize only one article. Of course, just as well may the downward motion of the bottom plate 4 be divided for the aforementioned purpose. In that case, only one article is pushed out of the trough by the first ejector during its first operative stroke. By a suitable placing of this preliminary stroke within the counting period different formations of groups can be obtained.

Figure 5:
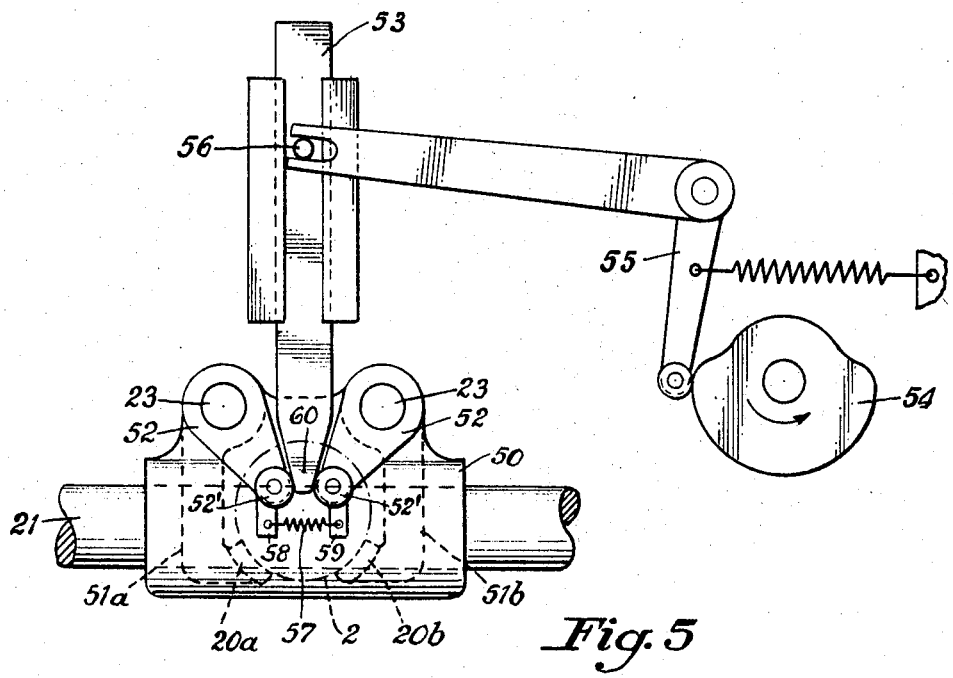
FIGS. 5 and 6 illustrate the article discharge mechanism.
Figure 6:
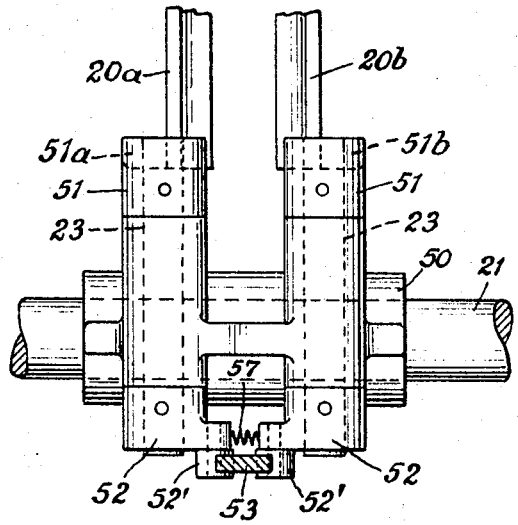

The FIGS. 5 and 6 disclose details of the mechanism for dropping the articles from the oppositely movable spaced parallel rails 20a and 20b as diagrammatically indicated in FIGS. 1 and 4. The shaft 21 carries a bearing block 50 which has rotatably mounted therein two parallel shafts 23 extending transversely to the shaft 21. The rails 20a and 20b are secured on arms 51a and 51b which in turn have fixed thereto collars 51 which are fixedly attached to one end of the parallel shafts 23. The other ends of the shafts 23 have the arms 52 attached thereto, the free ends of which carry rollers 52' between which a vertically arranged rod 53 is vertically movable. The rod 53 is operated by a crank arm drive 54, 55 and 56. A spring 57 attached to outwardly extending projections 58 and 59 on the arms 52 urges the rollers 52' on the latter in engagement with the tapered lowered end 60 of the rod 53. When the rod 53 moves downwardly, the parallel rails 20a and 20b are moved away from each other and drop or release the articles deposited upon the same.

What I claim is:

1. A device for separating groups of equal numbers of flat articles from a continuously supplied line of such articles, including a conveyor trough provided with a discharge aperture at one end, an adjustable bottom plate controlling said discharge aperture of said conveyor trough, at least one ejector for pushing said articles out of said trough when said bottom plate is adjusted, a collecting clamp for receiving said ejected articles, means for adjusting said collecting clamp to different positions, and means forming a storage space which is adapted to hold the articles ejected from said trough by said ejectors during the time said collecting clamp is unable to receive them.

2. A device according to claim 1, including a pivotally mounted pawl for locking the movement of said adjustable bottom plate when an insufficient number of articles are in the discharge end of said conveyor trough, and release means provided on said conveyor trough for releasing said pawl, said release means comprising a pivoted cover on said conveyor trough which is actuated by said articles in said conveyor trough and in turn releases said pawl.

3. A device according to claim 1, including means for adjusting said means forming said storage space during the storage period in order to adapt the space requirements, which increase in the course of the counting operation, to the contents of the storage space.

4. A device according to claim 1, in which said storage space is formed by a carrying plate and a slide plate adapted to be lowered relative to said carrying plate.

5. A device according to claim 1, in which said storage space is formed by a carrying plate and a slide plate adapted to be lowered relative to said carrying plate, said slide plate being connected to said collecting clamp in such a manner that the movement of said collecting clamp from its discharge position to its receiving position effects the lowering of said slide plate relative to said carrying plate.

6. A device according to claim 1, including a slide plate for transferring said stored articles at the end of the storage period to a plunger which controls the lowering of said articles along said collecting clamp during the remainder of the counting period.

References Cited

UNITED STATES PATENTS

| 2,954,881 | 10/1960 | Hopton | 214—7 |
| 3,051,333 | 8/1962 | Richert | 214—7 |
| 3,228,538 | 1/1966 | Coates | 214—8.5 X |

GERALD M. FORLENZA, *Primary Examiner.*

GEORGE F. ABRAHAM, *Assistant Examiner.*

U.S. Cl. X.R.

214—7